(12) United States Patent
Shinohara

(10) Patent No.: US 7,456,886 B2
(45) Date of Patent: Nov. 25, 2008

(54) IMAGE PICKUP APPARATUS

(75) Inventor: Mahito Shinohara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 10/679,386

(22) Filed: Oct. 7, 2003

(65) Prior Publication Data
US 2004/0080645 A1    Apr. 29, 2004

(30) Foreign Application Priority Data
Oct. 8, 2002    (JP) .............................. 2002-295043

(51) Int. Cl.
H04N 5/335    (2006.01)
H04N 3/14    (2006.01)

(52) U.S. Cl. .................................... 348/308

(58) Field of Classification Search ......... 348/300–302, 348/308
See application file for complete search history.

(56) References Cited

U.S. PATENT DOCUMENTS

| RE34,309 E | 7/1993 | Tanaka et al. .......... 358/213.31 |
| 5,288,988 A | 2/1994 | Hashimoto et al. ........ 250/208.1 |
| 5,424,529 A | 6/1995 | Hashimoto et al. ........ 250/208.1 |
| 5,587,738 A | 12/1996 | Shinohara ................... 348/302 |
| 5,698,844 A | 12/1997 | Shinohara et al. ............ 250/214 |
| 6,107,655 A * | 8/2000 | Guidash ...................... 257/233 |
| 6,300,615 B1 | 10/2001 | Shinohara ................... 250/214 |
| 6,731,335 B1 * | 5/2004 | Kim et al. ................... 348/308 |
| 6,734,906 B1 * | 5/2004 | Hashimoto .................. 348/302 |
| 6,956,605 B1 * | 10/2005 | Hashimoto .................. 348/301 |

(Continued)

FOREIGN PATENT DOCUMENTS

JP        04-313949        * 11/1992

(Continued)

OTHER PUBLICATIONS

Chinese Office Action, dated Oct. 21, 2004, issued in foreign counterpart Application 2003101000532 (2 pages with 2 page attachment).

(Continued)

*Primary Examiner*—Justin P Misleh
(74) *Attorney, Agent, or Firm*—Fitzpatrick, Cella, Harper & Scinto

(57) ABSTRACT

A solid-state image pickup apparatus including an array of a plurality of unit cells each including a plurality of photoelectric conversion elements for converting an photosignal to signal charge and storing it and one amplification element for receiving signal charge of each of the conversion elements and outputting a signal corresponding thereto, includes a readout circuit system connected to an output line of the amplification element, inputting thereto a signal output from the unit cell via the output line. The readout circuit system includes a difference unit for inputting thereto a first signal corresponding to a reset level of an input portion of the amplification element, a second signal corresponding to the first signal to which a signal corresponding to signal charge in at least one of the plurality of photoelectric conversion elements is added, and a third signal corresponding to the second signal to which a signal corresponding to signal charge in at least one of the plurality of photoelectric conversion elements is added, operating a difference with respect to a plurality of combinations of any two of the three signals.

2 Claims, 7 Drawing Sheets

U.S. PATENT DOCUMENTS

2002/0024068 A1    2/2002    Shinohara .................. 257/225

FOREIGN PATENT DOCUMENTS

JP    2000-78475    3/2000
JP    2000078474    3/2000

OTHER PUBLICATIONS

Yusa, A., et al. *SIT Image Sensor: Design Considerations and Characteristics*, 33 IEEE Transactions on Electronic Devices, No. 6 Jun. 1986 pp. 735-742.

Nakamura et al., *Gate Accumulation Type mos Phototransistor Image Sensor*, 41 Proceedings of the Institute of Television Engineers of Japan, No. 11 Nov. 1987, pp. 1075-1082.

Mendis, S.K., et al. *A 128x128 CMOS Active Pixel Image Sensor for Highly Integrated Imaging System*, IEDM Technical Digest 1993 pp. 583-586.

Tanaka, N., *A 310k Pixel Bipolar Imager (BASIS)*, 36th IEEE International Solid State Circuits Conference, Feb. 15-17, 1989 pp. 96-97.

* cited by examiner

IMAGE PICKUP APPARATUS

BACKGROUND OF THE INVENTION

1. Field of the Invention

The present invention relates to a solid-state image pickup apparatus, drive method thereof, and an image pickup system. In particular, the present invention relates to an amplification type solid-state image pickup-apparatus having a pixel configuration in which a single amplification transistor receives signals from a plurality of photodiodes, and drive method thereof.

2. Related Background Art

Conventionally, CCDs have been used in many cases as solid-state image pickup apparatuses because of their high signal-to-noise ratio. On the other hand, however, development of so-called amplification type solid-state image pickup apparatus having the advantage of simple usage and low power consumption has been conducted.

The amplification type solid-state image pickup apparatus is a type in which signal charges stored in light receiving pixels are led to a control electrode of a transistor arranged in a pixel section and an amplified signal is output from its main electrode. As for the amplification transistor, there are an SIT image sensor using SITs (static induction transistors) (see, for example, A. Yusa, J. Nishizawa et al., "SIT image sensor: Design consideration and characteristics," IEEE trans., June 1986, Vol. ED-33, pp. 735-742), a BASIS using bipolar transistors (see, for example, N. Tanaka et al., "A 310K pixel bipolar imager (BASIS)," IEEE Trans. Electron Devices, May 1990, vol. 35, pp. 646-652), a CMD using JFETs (Junction-type field effect transistors) a control electrode of each of which is depleted (see, for example, Nakamura etc., "Gate accumulation type MOS phototransistor image sensor," Proceedings of the Institute of Television Engineers of Japan, November 1987, Vol. 41, No. 11, pp. 1075-1082), a CMOS sensor using MOS transistors (see, for example, S. K. Mendis, S. E. Kemeny and E. R. Fossum, "A 128×128 CMOS active image sensor for highly integrated imaging systems," in IEDM Tech. Dig., 1993, pp. 583-586). In particular, CMOS sensors has technological advantages that they match with the CMOS process and is favorable for fabricating a peripheral CMOS circuit on the chip, and consequently great effort has been made in development of the CMOS sensors.

A problem common to these amplification type solid-state image pickup apparatuses is that the output offset of an amplification transistor for each pixel differs from pixel to pixel and consequently fixed pattern noise (FPN) is added to an image sensor signal. In order to remove this FPN, various signal readout circuits have been devised heretofore. Furthermore, CMOS sensors have a drawback that the number of MOS transistors forming one pixel is larger and pixel contraction is difficult as compared with CCDs.

On the other hand, a CMOS sensor having a configuration in which one common amplifier is provided for a plurality of pixels was proposed (see, for example, Japanese Patent Application Laid-Open Publication No. 2000-78474). In this CMOS sensor, pixel contraction is facilitated because of the reduction of the number of MOS transistors in a pixel.

FIG. 5 is a circuit diagram showing a common amplifier type CMOS image sensor. In order to simplify the description, it is supposed in FIG. 5 that a pixel section has a pixel configuration of two rows (horizontal direction) by two columns (vertical direction) and pixels corresponding to two rows adjacent form a pixel unit serving as one unit cell.

In the common amplifier type CMOS image sensor shown in FIG. 5, reference numeral 1 denotes a pixel unit formed of two pixels included in the pixel section, and 2-1 and 2-2 denote photodiodes in two rows (first and second rows) for receiving light and storing signal charge in the pixel unit 1. Reference numeral 3 denotes an amplification MOS transistor for amplifying the signal charge accumulated in the photodiode 2-1 or 2-2 and outputting the amplified signal charge. Reference numerals 4-1 and 4-2 denote transfer MOS transistors respectively for transferring the signal charge accumulated in the photodiodes 2-1 and 2-2 to a gate electrode section in the amplification MOS transistor 3. Reference numeral 5 denotes a reset MOS transistor for resetting a gate electrode potential of the amplification MOS transistor 3. Reference numeral 6 denotes an electric power supply voltage supply line. Drain electrodes of the reset MOS transistor 5 and the amplification MOS transistor 3 are connected in common to the electric supply voltage supply line.

Reference numeral 7 denotes a selection switch MOS transistor for selecting the amplification MOS transistor 3. Reference numeral 8 denotes a pixel output line (vertical output line). When the selection switch MOS transistor 7 turns on, then transmission between a source electrode of the amplification MOS transistor 3 and the pixel output line 8 is attained, and a signal output of a selected amplification MOS transistor 3 is led to the pixel output line 8.

Reference numeral 9 denotes a constant current supply MOS transistor for supplying a constant current to the pixel output line 8. The selected amplification MOS transistor 3 is activated to operate as a source follower via the selection switch MOS transistor 7. Thus, a potential having a certain voltage difference with respect to the gate potential of the amplification MOS transistor 3 appears on the pixel output line 8.

Reference numerals 10-1 and 10-2 denote transfer control lines (horizontal drive lines) for controlling the gate potentials of the transfer MOS transistors 4-1 and 4-2, respectively. Reference numeral 11 denotes a reset control line (horizontal drive line) for controlling the gate potential of the reset MOS transistor 5. Reference numeral 12 denotes a selection control line for controlling the gate potential of the selection MOS transistor 7. Reference numeral 13 denotes a constant potential supply line for supplying a constant potential to the gate of the constant current supply MOS transistor 9 so as to make the constant current supply MOS transistor 9 operate in a saturate region to function as a constant current supply.

Reference numerals 14-1 and 14-2 denote drive pulse terminals for supplying a transfer pulse to the transfer control lines 10-1 and 10-2, respectively. Reference numeral 15 denotes a drive pulse terminal for supplying a reset pulse to the reset control line 11. Reference numeral 16 denotes a drive pulse terminal for supplying a selection pulse to the selection control line 12. Reference numeral 17 denotes a vertical scanning circuit for successively selecting and scanning rows of pixels arranged in a matrix form. Reference numeral 18 denotes an output line of the vertical scanning circuit 17.

Reference numerals 19-1 and 19-2 denote switch MOS transistors for leading pulses from the drive pulse terminals 14-1 and 14-2 to the transfer control lines 10-1 and 10-2, respectively. Reference numeral 20 denotes a switch MOS transistor for leading a pulse from the drive pulse terminal 15 to the reset control line 11. Reference numeral 21 denotes a switch MOS transistor for leading a pulse from the drive pulse terminal 16 to the selection control line 12. Gates of these switch MOS transistors 19-1, 19-2, 20 and 21 are connected to the row selection output line 18. A line in which pixels are driven is determined depending on a state of the row selection output line 18.

Reference numeral 22 denotes a readout circuit for reading out outputs from a pixel. Reference numeral 23 denotes a capacitance (storage capacitance) for holding a reset level output of a pixel. Reference numeral 24 denotes a capacitance (storage capacitance) for holding photo-signal output of a pixel. Reference numeral 25 denotes a switch MOS transistor between the pixel output line 8 and the capacitance 23. Reference numeral 26 denotes a switch MOS transistor between the pixel output line 8 and the capacitance 24. Reference numeral 27 denotes a noise output line (horizontal output line) to which a reset output held in the capacitance 23 is led. Reference numeral 28 denotes a signal output line (horizontal output line) to which a photosignal output held in the capacitance 24 is led. Reference numeral 29 denotes a switch MOS transistor between the capacitance 23 and the noise output line 27. Reference numeral 30 denotes a switch MOS between the capacitance 24 and the signal output line 28. Reference numeral 31 denotes a noise output line reset MOS transistor for resetting a potential on the noise output line 27. Reference numeral 32 denotes a signal output line reset MOS transistor for resetting a potential on the signal output line 28. Reference numeral 33 denotes a reset power supply terminal for supplying a reset potential to source electrodes of the noise output line reset MOS transistor 31 and the signal output line reset MOS transistor 32. Reference numeral 34 denotes a horizontal scanning circuit for successively selecting a pair of the capacitances provided for every column of pixels arranged in the matrix form. Reference numeral 35-1 denotes an output line for selecting a first column, and 35-2 denotes an output line for selecting a second column. Two output lines 35-1 and 35-2 of the horizontal scanning circuit 34 are connected to corresponding switch MOS transistors 29 and 30 respectively.

Reference numeral 36 denotes a pulse supply terminal for applying a pulse to gates of the reset MOS transistors 31 and 32. Reference numerals 37 and 38 denote pulse supply terminals for applying a pulse to gates of the switch MOS transistors 25 and 26, respectively. Reference numeral 39 denotes a differential amplifier for taking a difference voltage between the potential on the noise output line 27 and the potential on the signal output line 28 and outputting the amplified difference voltage. Reference numeral 40 denotes an output terminal of the differential amplifier 39.

Operation conducted by the common amplifier type CMOS image sensor shown in FIG. 5 will now be described with reference to a timing chart shown in FIG. 6. It is now supposed that all MOS transistors shown in FIG. 5 are N type and each of the MOS transistors is in its on-state when its gate potential is at a high level whereas each of the MOS transistors is in its off-state when its gate potential is at a low level. Numbers indicating timing pulses in FIG. 6 ($\phi$14-1, $\phi$14-2, $\phi$15, $\phi$16, $\phi$18, $\phi$35-1, $\phi$35-2, $\phi$36, $\phi$37 and $\phi$38) correspond with the drive pulse input terminals 14-1, 14-2, 15, 16, the output line 18 of the vertical scanning circuit 17, the output lines 35-1 and 35-2 of the horizontal scanning circuit 34, and the drive pulse input terminals 36, 37 and 38 shown in FIG. 5.

First, when the drive pulse $\phi$18 output to the output line 18 of the vertical scanning circuit 17 is changed to the high level by operation of the vertical scanning circuit 17, then it becomes possible for the pixel section shown in FIG. 5 to operate. When in this state the drive pulse $\phi$16 input to the terminal 16 becomes the high level, then the source of the amplification MOS transistor 3 of the pixel is connected to the constant current supply MOS transistor 9 serving as the constant current supply source via the output line 8 and thereby the source follower output of the pixel is output to the output line 8.

By shifting the drive pulse $\phi$15 input to the terminal 15 to its high level, the gate section of the amplification MOS transistor 3 is reset by the reset MOS transistor 5. In case that subsequently the drive pulse $\phi$37 at the high level is applied to the terminal 37, then a reset level output of the amplification MOS transistor 3 is stored in the capacitance 23 via the MOS transistor 25.

Subsequently, by applying the drive pulse $\phi$14-1 of the high level to the terminal 14-1, the signal charge stored in the photodiode 2-1 in the first row is transferred to the gate of the amplification MOS transistor 3 via the transfer MOS transistor 4-1 in the first row. When subsequently the drive pulse $\phi$38 at the high level is applied to the terminal 38, a signal output superimposed on the reset level is stored in the capacitance 24 via the switch MOS transistor 26. Variance appears on the reset output of pixels because there are variance in threshold voltages of the amplification MOS transistors 3 for pixels.

Therefore, a difference between outputs stored in the capacitance 23 and in the capacitance 24 is a pure signal free from noise. Then, when the horizontal scanning circuit 34 is activated, therefore, the drive pulses $\phi$35-1 and $\phi$35-2 respectively output to its output lines 35-1 and 35-2 successively shift to the high level, and outputs stored in the capacitances 23 and 24 in each column are led to the horizontal output lines 27 and 28 via the MOS transistors 29 and 30, respectively. Before the drive pulses $\phi$35-1 and $\phi$35-2 of the high level respectively at the terminals 35-1 and 35-1 are output, it is necessary to shift the drive pulse $\phi$36 to the high level and reset the horizontal output lines 27 and 28 via the MOS transistors 31 and 32.

The pixel reset level output and the signal output plus the pixel reset level output led respectively to the horizontal output lines 27 and 28 are input to the differential amplifier 39. The signal output from which the reset level is subtract, i.e., the pixel signal free from noise is output from the output terminal 40. Outputting the signal charge stored in the photodiode 2-2 in the second row is accomplished by applying the drive pulse $\phi$14-2 to the terminal 14-2 instead of the terminal 14-1 and conducting other drives in the same way as outputting of the signal charge stored in the photodiode 2-1 in the first row.

In the configuration and operation described heretofore, pixels are read row by row. On the other hand, the technique of reading out every two rows in order to shorten the readout time of the whole frame is also known.

FIG. 7 is a circuit diagram showing a solid-state image pickup apparatus corresponding to such a case. FIG. 7 shows a pixel unit and two readout circuit systems connected to a pixel output line of the pixel unit. In FIG. 7, components forming each of the readout circuit systems are the same as those shown in FIG. 5. Each of components is denoted with a suffix 1 or 2 so as to be associated with one of the two readout circuit systems. For simplicity, only one column is shown in FIG. 7, and description of the vertical scanning circuit and pixel unit is omitted. These omitted components are the same as those of FIG. 5.

In the solid-state image pickup apparatus shown in FIG. 7, readout from the pixel can be implemented by storing the reset level output of the amplification MOS transistor 3 and a signal corresponding to the photodiode 2-1 in the first row, in one readout circuit 22-1 and subsequently storing the reset level output of the amplification MOS transistor 3 and a signal corresponding to the photodiode 2-2 in the second row, in the other readout circuit 22-2. Subsequently, horizontal scanning is conducted. In this horizontal scanning, two readout circuits 22-1 and 22-2 are simultaneously driven. As a result, pixel signals corresponding to the two rows are output in parallel at the same time.

As heretofore described, in the CMOS sensor including the amplification transistor common to a plurality of photodiodes, pixel contraction is possible and, in addition, a signal having a high signal-to-noise ratio can be output.

In the conventional art in which consecutive readout from two rows shown in FIG. 7 is conducted, however, time required for readout from pixels to the readout circuit is twice the time required for readout from pixels of to one row. The readout from the pixels to the readout circuit is conducted within a horizontal blanking period. Especially in image sensors for moving pictures, the horizontal blanking period is limited by standards. In the case where the pixel readout time corresponding to two rows exceeds the horizontal blanking time, the two-row readout method cannot be used, resulting in a drawback.

SUMMARY OF THE INVENTION

An object of the present invention is to shorten the signal readout time of pixels in a solid-state image pickup apparatus arranged to have an amplification element common to a plurality of photoelectric conversion elements.

In order to attain the object, a solid-state image pickup apparatus according to one aspect of the present invention which includes an array of a plurality of unit cells, each of the unit cells including a plurality of photoelectric conversion elements for converting an photo-signal to signal charge and storing the signal charge and one amplification element for receiving signal charge of each of the photoelectric conversion elements and outputting a signal corresponding to the signal charge, comprises a readout circuit system connected to an output line of the amplification element, for inputting thereto a signal output from the unit cell via the output line. The readout circuit system of the present invention includes a difference unit for inputting thereto a first signal corresponding to a reset level of an input portion of the amplification element, a second signal corresponding to the first signal to which a signal corresponding to signal charge stored in at least one of the plurality of photoelectric conversion elements is added, and a third signal corresponding to the second signal to which a signal corresponding to signal charge stored in at least one of the plurality of photoelectric conversion elements is added, and operating a difference with respect to a plurality of combinations of any two signals of the first, second and third signals.

DESCRIPTION OF THE PREFERRED EMBODIMENTS

Hereafter, embodiments of the present invention will be described with reference to the drawings.

First Embodiment

Figure 1:
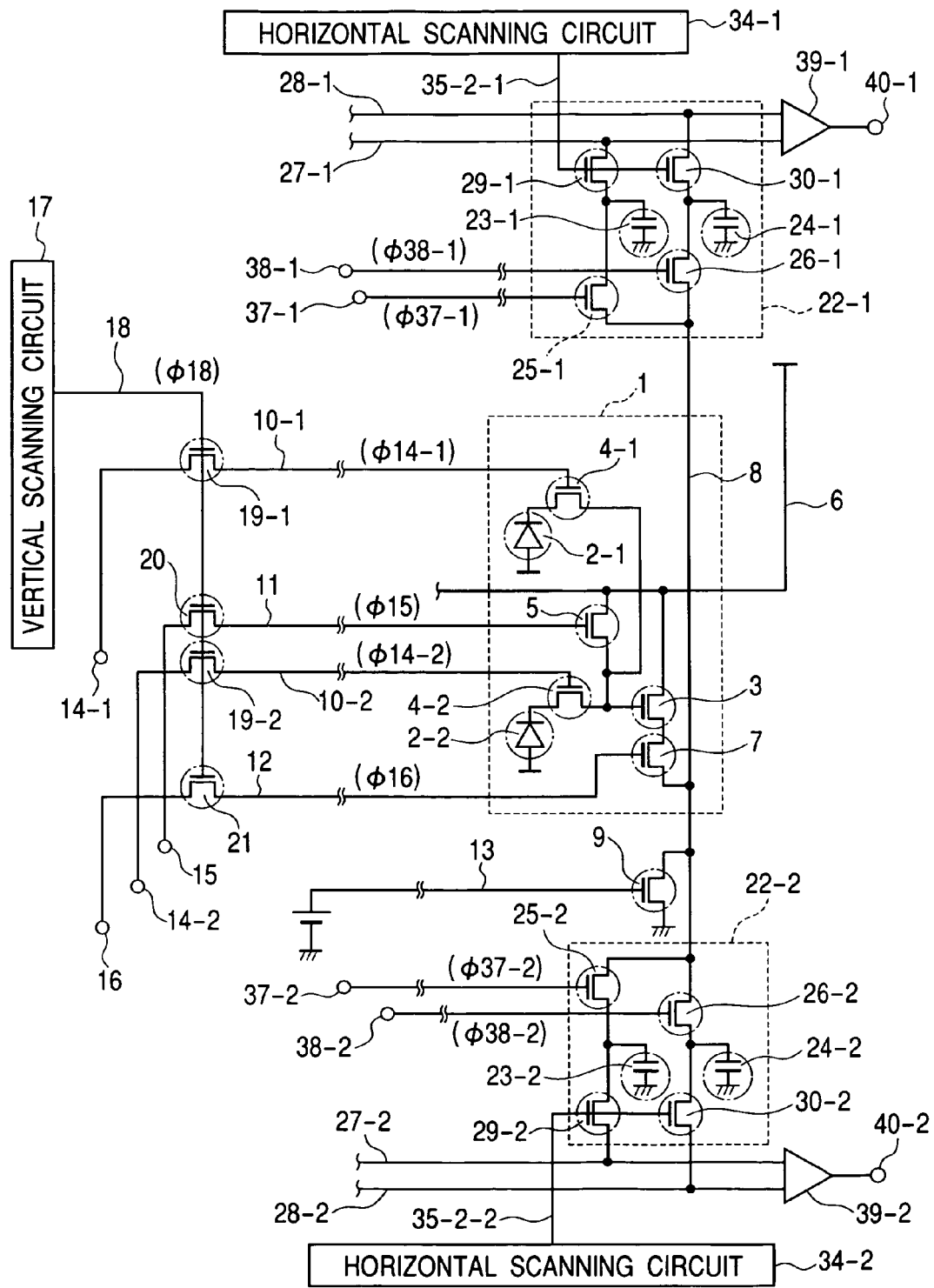
FIG. 1 is a circuit diagram showing a solid-state image pickup apparatus of a first embodiment according to the present invention.
Figure 2:
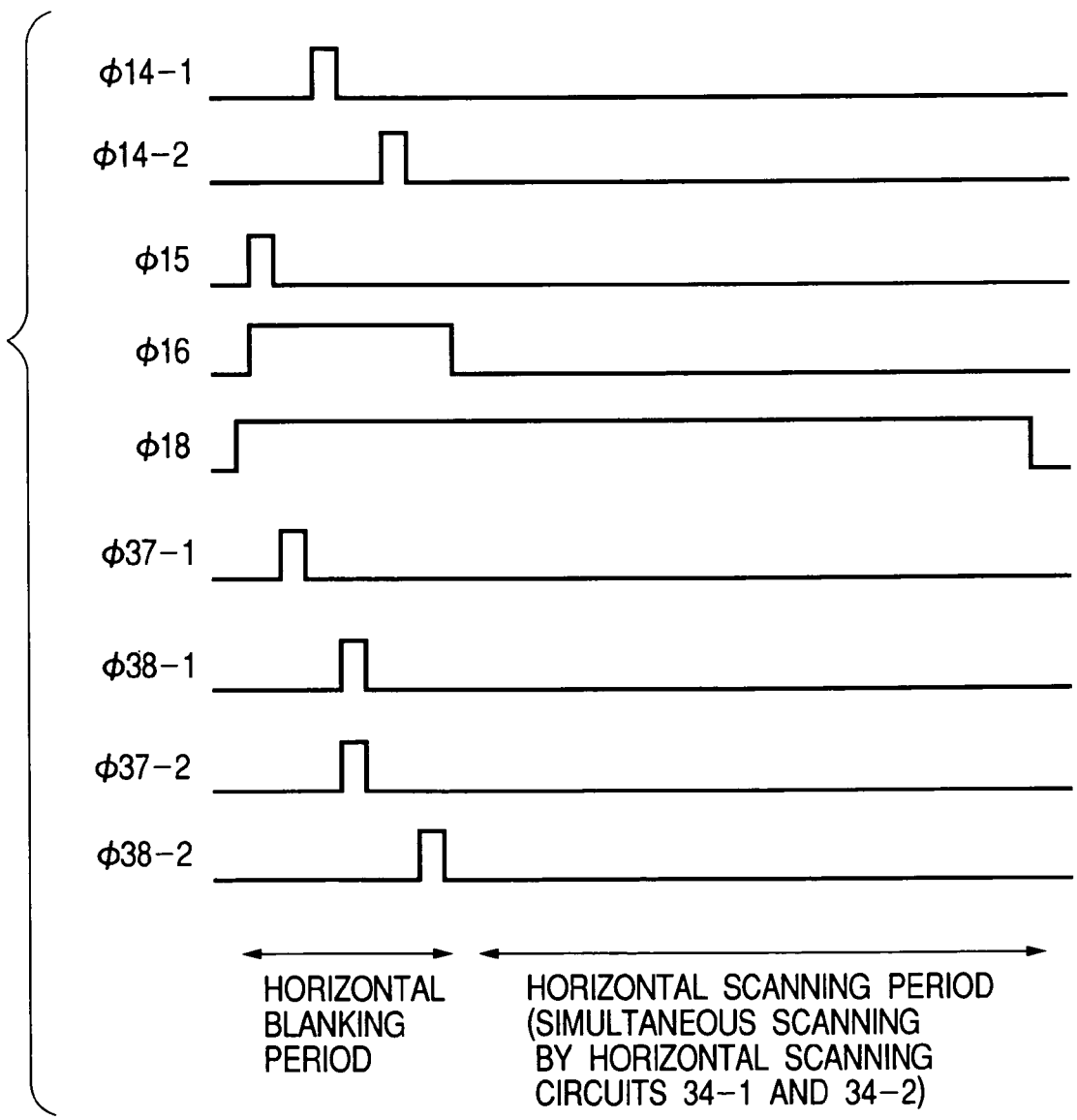
FIG. 2 is a drive timing chart showing operation of a solid-state image pickup apparatus of a first embodiment according to the present invention.

FIG. 1 shows a circuit configuration of a solid-state image pickup apparatus according to a first embodiment of the present invention. FIG. 2 shows a drive timing chart of the solid-state image pickup apparatus.

Figure 5:
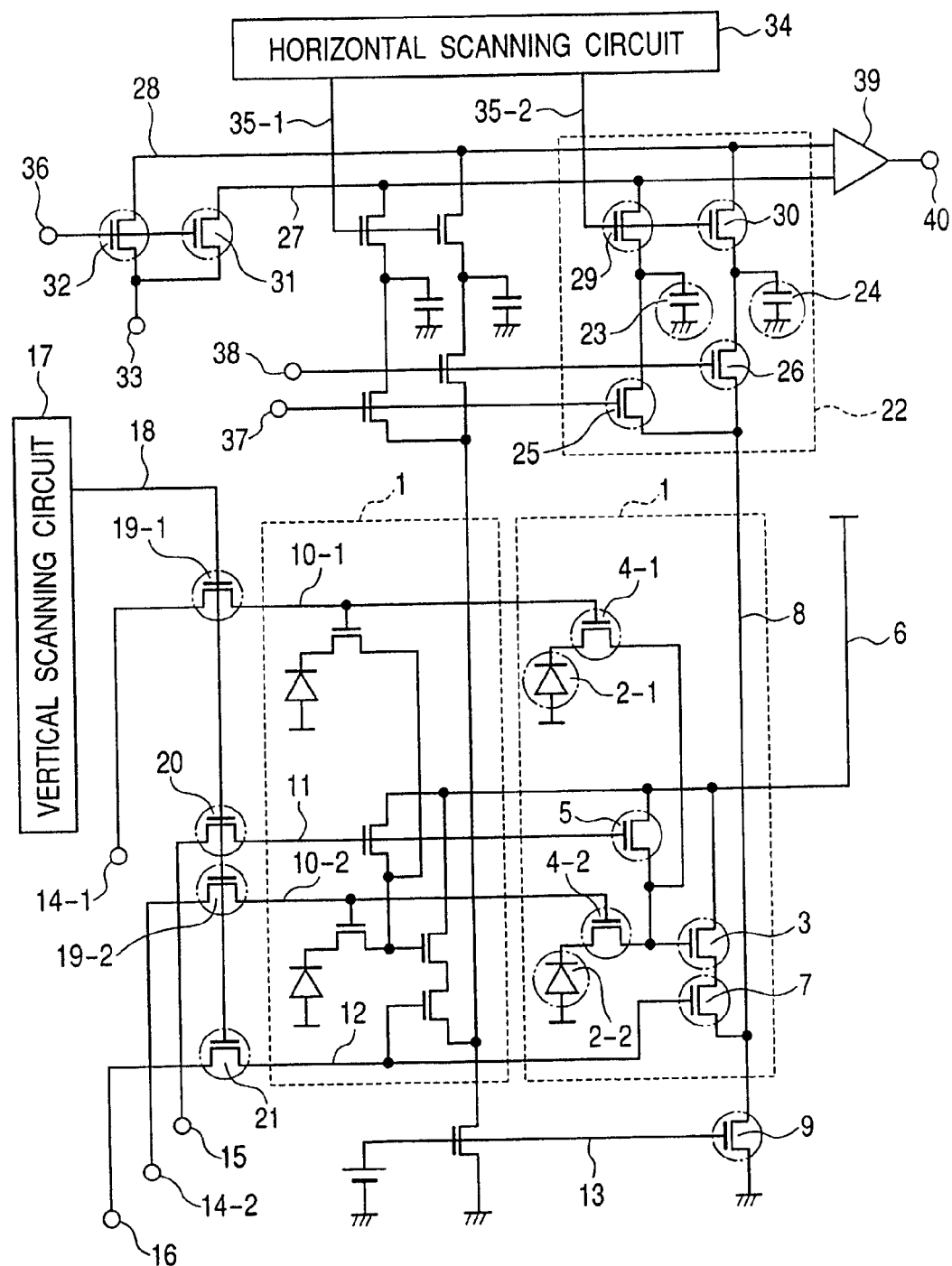
FIG. 5 is a circuit diagram showing a conventional solid-state image pickup apparatus.
Figure 6:
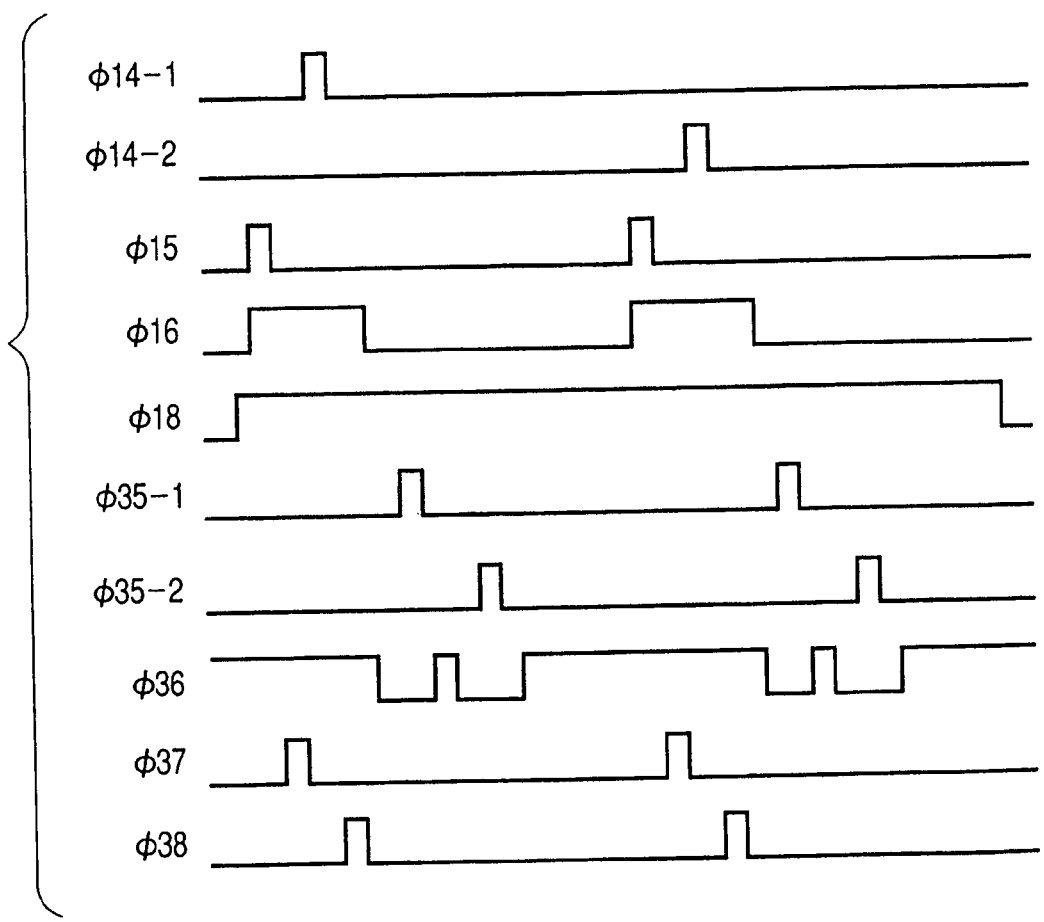
FIG. 6 is a drive timing chart showing operation of a conventional solid-state image pickup apparatus.
Figure 7:
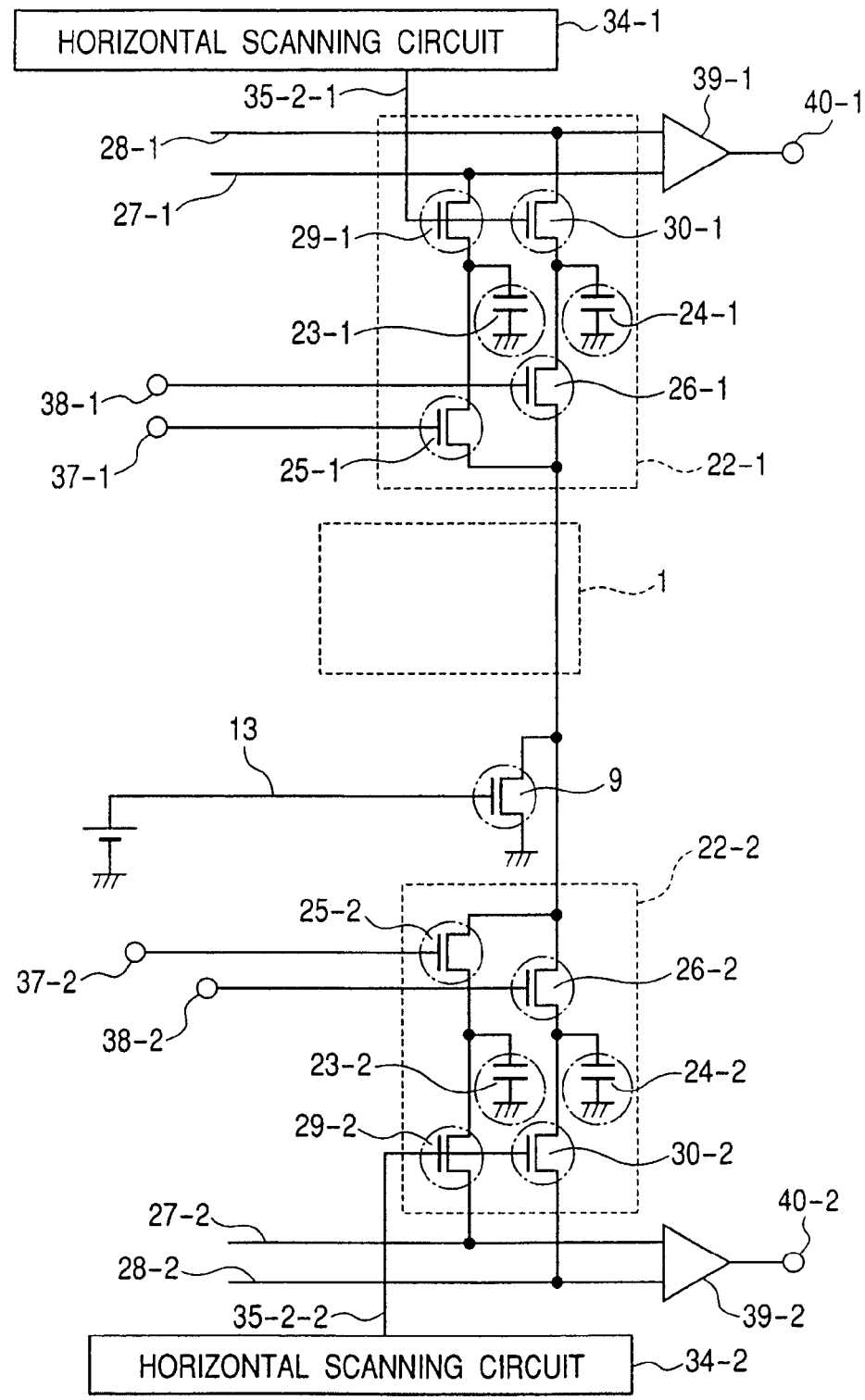
FIG. 7 is a circuit diagram showing a conventional solid-state image pickup apparatus (image sensor) in which two readout circuit systems having a difference function are connected to a vertical output line.

The solid-state image pickup apparatus shown in FIG. 1 has a pixel section including a pixel unit 1 (in the example shown in FIG. 1, only a pixel unit formed of two pixels in the first row and the second row is shown) serving as a unit cell formed of two pixels in the same way as the circuit configuration of the conventional art shown in FIG. 5, a vertical scanning system, and two readout circuit systems having a circuit configuration similar to that in which two conventional readout circuit systems each having a difference function as shown in FIG. 7 are connected to a vertical output line.

In other words, the pixel section includes the pixel unit 1 formed of two pixels, as shown in FIG. 1. The pixel unit 1 includes photodiodes 2-1 and 2-2 of two rows (first and second rows), corresponding to a plurality of photodiodes in the present invention, an amplification MOS transistor 3, transfer MOS transistors 4-1 and 4-2 of the first and second rows, a reset MOS transistor 5, an electric supply voltage supply line 6, a selection switch MOS transistor 7, and a pixel output line 8.

The vertical scanning system includes a constant current supply transistor 9 and its constant potential supply line 13 connected to the pixel unit 1, transfer control lines 10-1 and 10-2, a reset control line 11, a selection control line 12, pulse terminals 14-1, 14-2, 15 and 16, a row selection output line 18, switch MOS transistors 19-1, 19-2, 20 and 21, a vertical scanning circuit 17, and its row selection output line 18.

As shown in FIG. 1, one of the two readout circuit systems includes a readout circuit 22-1, a horizontal scanning circuit 34-1, pulse supply terminals (drive pulse terminals) 37-1 and 38-1, a differential amplifier 39-1, and its signal output terminal 40-1. The readout circuit 22-1 includes a pixel reset level output holding capacitance 23-1, a pixel photo-signal output holding capacitance 24-1, switch MOS transistors 25-1, 26-1, 29-1 and 30-1, a noise output line 27-1, a signal output line 28-1, and a first column selection output line 35-2-1.

In addition, the other of the two readout circuit systems has a similar circuit configuration. In other words, the other of the two readout circuit systems includes a readout circuit 22-2, a horizontal scanning circuit 34-2, pulse supply terminals 37-2 and 38-2, a differential amplifier 39-2, and its signal output terminal 40-2. The readout circuit 22-2 includes a pixel reset level output holding capacitance 23-2, a pixel photosignal output holding capacitance 24-2, switch MOS transistors 25-2, 26-2, 29-2 and 30-2, a noise output line 27-2, a signal output line 28-2, and a first column selection output line 35-2-2.

Since the circuit configuration is similar to the circuit configuration in the conventional art, description thereof will be omitted. Since the first embodiment differs from the conventional art in the solid-state image pickup apparatus drive method, this will be described hereafter in detail with reference to a drive timing chart shown in FIG. 2. Numbers indicating timing pulses in FIG. 2 ($\phi$14-1, $\phi$14-2, $\phi$15, $\phi$16, $\phi$18, $\phi$37-1, $\phi$38-1, $\phi$37-2 and $\phi$38-2) are associated with the pulse input terminals 14-1, 14-2, 15, 16, the row selection output line 18 of the vertical scanning circuit 17, and the pulse input terminals 37-1, 38-1, 37-2, and 38-2.

First, when the pulse $\phi$18 output to the output line 18 is shifted to its high level by operation of the vertical scanning circuit 17 as shown in FIG. 2, then it becomes possible for the pixel section to operate. When the pulse $\phi$16 input to the terminal 16 subsequently becomes high, then the source of the amplification MOS transistor 3 of the pixel is connected to the constant current supply 9 via the output line 8 and thereby the source follower output of the pixel is output to the pixel output line 8.

By shifting the pulse $\phi$15 input to the terminal 15 to its high level, the gate section of the amplification MOS transistor 3 is reset by the reset MOS transistor 5. If the pulse $\phi$37-1 at the high level is then applied to the terminal 37-1, a reset level output (which corresponds to a first signal in the present invention) of the amplification transistor 3 is stored in the capacitance 23-1 via the switch MOS transistor 25-1.

Subsequently, by applying the pulse $\phi$14-1 of the high level to the terminal 14-1, the signal charge stored in the photodiode 2-1 in the first row of the pixel unit 1 is transferred to the gate of the MOS transistor 3 via the transfer MOS transistor 4-1. When subsequently the drive pulse $\phi$38-1 and $\phi$37-2 each of the high level are respectively applied to the terminals 38-1 and 37-2, an output (which corresponds to a second signal in the present invention) corresponding to the reset level of the pixel, to which a signal from the photodiode 2-1 in the first row is added is stored in the capacitance 24-1 via the switch MOS transistor 26-1 and stored in the capacitance 23-2 via the switch MOS transistor 25-2.

Subsequently, by applying the pulse $\phi$14-2 of the high level to the terminal 14-2, signal charge stored in the photodiode 2-2 in the second row is transferred to the gate of the amplification MOS transistor 3 via the transfer MOS transistor 4-2. As a result, an output (which corresponds to a third signal in the present invention) corresponding to the signal from the photodiode 2-2 in the second row plus a signal from the photodiode 2-1 in the first row added to the pixel reset level is stored in the capacitance 24-2 via the switch MOS transistor 26-2.

Operation described heretofore is conducted within a horizontal blanking period. Subsequently, when a horizontal scanning period starts, then the horizontal scanning circuits 34-1 and 34-2 are simultaneously driven, and the signals stored in the readout circuits 22-1 and 22-2 are led to the differential amplifiers 39-1 and 39-2, respectively.

Among them, the differential amplifier 39-1 receives the pixel reset level output (the first signal) and the output (the second signal) corresponding to the reset level of the pixel added to the signal from the photodiode 2-1 in the first row. And the differential amplifier 39-1 outputs the signal from the photodiode 2-1 in the first row, via the output terminal 40-1.

On the other hand, the differential amplifier 39-2 receives the output (the second signal) corresponding to the reset level of the pixel added to the signal from the photodiode 2-1 in the first row, and the output (the third signal) corresponding to the reset level of the pixel added to the signal from the photodiode 2-1 in the first row and the signal from the photodiode 2-2 in the second row. And the differential amplifier 39-2 outputs the signal from the photodiode 2-2 in the second row, via the output terminal 40-2.

Even in a time-shortening operation in which reset operation for the amplification MOS transistor is not interposed between readout operations of two rows, signals from respective photodiodes free from noise can be obtained independently, owing to the operation heretofore described.

In a solid-state image pickup apparatus (image sensor) having a pixel configuration in which one amplification MOS transistor receives signals from a plurality of photodiodes, therefore, the first embodiment makes it possible to read out the signals from the photodiodes to the readout circuit system in shorter time as compared with the conventional art.

Second Embodiment

Figure 3:
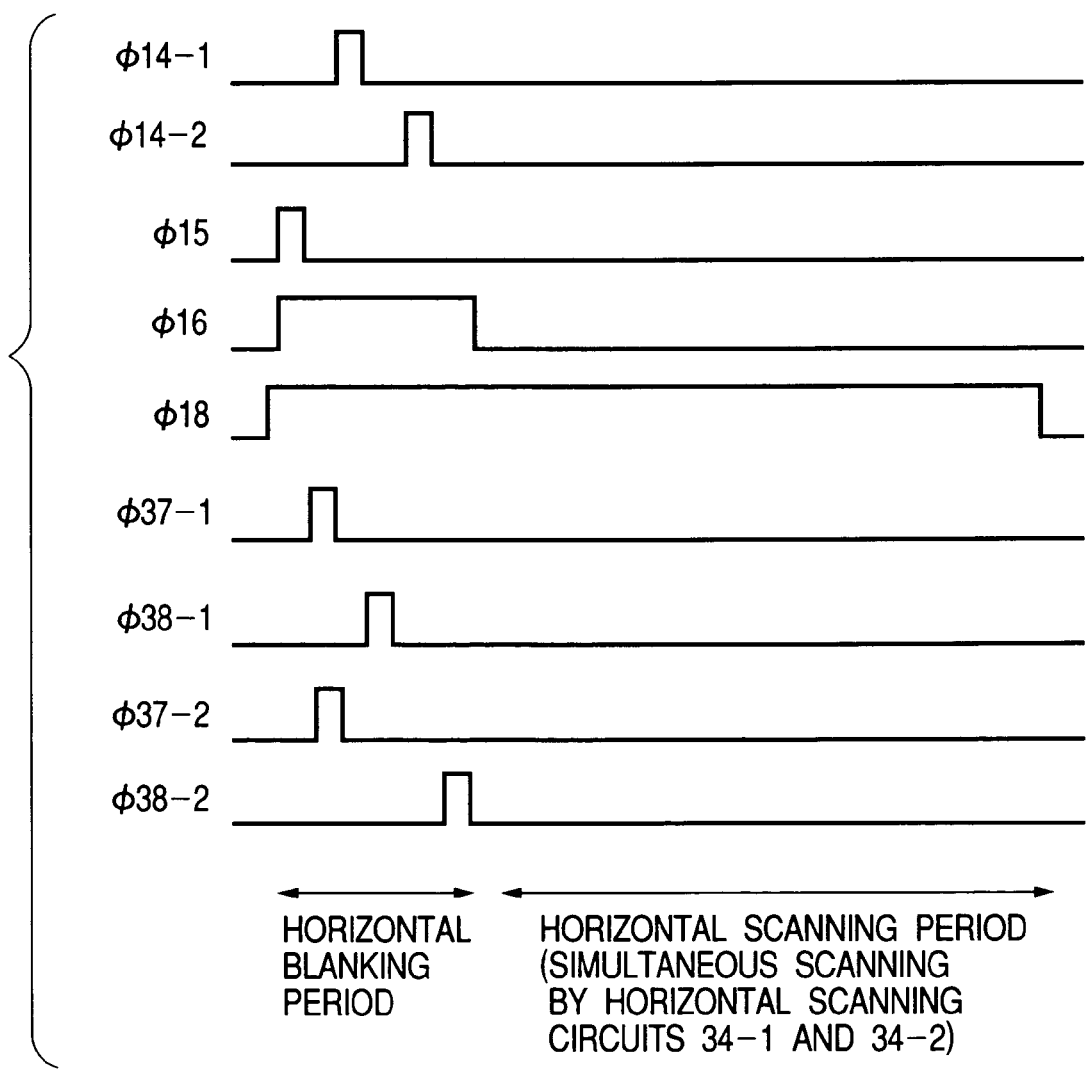
FIG. 3 is a drive timing chart showing operation of a solid-state image pickup apparatus of a second embodiment according to the present invention.

FIG. 3 is a drive timing chart of a solid-state image pickup apparatus according to a second embodiment of the present invention. Since the solid-state image pickup apparatus of the second embodiment has the same circuit configuration as that of the first embodiment, its description will be omitted. The second embodiment differs from the first embodiment in timing of the pulse $\phi$37-2 input to the terminal 37-2. An output corresponding to the reset level of the amplification MOS transistor 3 is stored in the storage capacitance 23-2. As a result, a sum signal obtained from the signal from the photodiode 2-1 in the first row and the signal from the photodiode 2-2 in the second row is output from the output terminal 40-2.

In a single-chip color sensor, a sum output of pixel signals in adjacent rows is used as a luminance signal in some cases. In case that the second embodiment is used, a luminance signal is obtained as a chip output. Since the necessity of signal processing for obtaining a luminance signal outside the chip is thus dispensed with, a luminance signal having a favorable signal-to-noise ratio can be obtained.

For obtaining a color signal in the second row, signal processing of subtracting the output at the terminal 40-1 from the output at the terminal 40-2 is necessary. It is possible that noise may be introduced into the color signal due to the signal processing. Since signal-to-noise ratio of luminance signal is more important than that of color signal, however, the drive method of the second embodiment is effective in such a case.

In a time-shortening operation in which reset operation for the amplification MOS transistor is not interposed between readout operations of rows when consecutively reading out pixels of two rows, signals from photodiodes and a pixel sum signal from adjacent rows can be obtained at a high signal-to-noise ratio, owing to the operation heretofore described.

In a solid-state image pickup apparatus (image sensor) having a pixel configuration in which one amplification MOS transistor receives signals from a plurality of photodiodes, therefore, the second embodiment makes it possible to read out the signals from the photodiodes and their sum signal to the readout circuit system in shorter time as compared with the conventional art.

Besides the two embodiments, the following configuration, for example, is also conceivable. In this configuration, three storage capacitances are provided in a readout circuit. Three horizontal output lines are provided to lead thereto signals from the three capacitances. A plurality of differential amplifiers are prepared for a plurality of possible combinations of two of the three horizontal output lines. Two horizontal output lines corresponding to each of the combinations are input to a differential amplifier. In this configuration, the reset level output (a first signal) from the amplification transistor, an output (a second signal) corresponding to the reset level to which a first photodiode signal is added, and an output (a third signal) corresponding to the reset level to which the first photodiode signal and a second photodiode signal are added, are stored in the three storage capacitances, respectively.

In this way, various examples can be considered as the readout circuit having the difference function. As long as a configuration has a readout circuit having a difference function with respect to a plurality of combinations obtained by selecting two outputs of a plurality of kinds of outputs obtained by successively adding photodiode signals to the reset level output read out from the pixel unit, the configuration materializes an embodiment according to the present invention. In the above-described two embodiments, a unit cell (pixel unit) having such a configuration that one amplification element is used for two photoelectric conversion elements is exemplified. However, this is not restrictive, but such a configuration that one amplification element is used for three or more photoelectric conversion elements can also be used. In this case, it is possible to use the reset level output of the amplification transistor as a first signal, an output obtained as a second signal by adding at least one photodiode signal to the first signal, an output obtained as a third signal by adding at least one photodiode signal to the second signal, an output obtained as a fourth signal by adding at least one photodiode signal to the third signal, and so forth. In this case as well, a difference is obtained with respect to a plurality of combinations obtained by selecting two signals of the first signal, the second signal, the third signal, the fourth signal, and so forth.

For example, it is now supposed that in a solid-state image pickup element including Bayer array of R, G and B color filters, a unit cell has such a configuration that one amplification transistor is used for four photodiodes, which are adjacent to each other and which correspond to a R (red color) filter, a B (blue color) filter and two G (green colors) filters. In this case, it is possible to use the reset level output of the amplification transistor as a first signal, use an output obtained as a second signal by adding two photodiode signals corresponding to two G color filters to the first signal, use an output obtained as a third signal by adding a photodiode signal corresponding to an R or B color filter to the second signal, and use an output obtained as a fourth signal by adding a photodiode signal corresponding to the remaining B or R color filter to the third signal. In this example, a sum signal of two photodiode signals corresponding to the two G color filters is obtained by operating a difference between the first signal and the second signal. A photodiode signal corresponding to the R or B color filter is obtained by operating a difference between the second signal and the third signal. The photodiode signal corresponding to the remaining B or R color filter is obtained by operating a difference between the third signal and the fourth signal. This example is nothing but an example. Selection of the second to fourth signals and combinations of signals are not restricted to those in the example.

By the way, the N-type and P-type of a MOS transistor and polarities of the drive pulses in the above-described two embodiments may be reversed.

Figure 4:
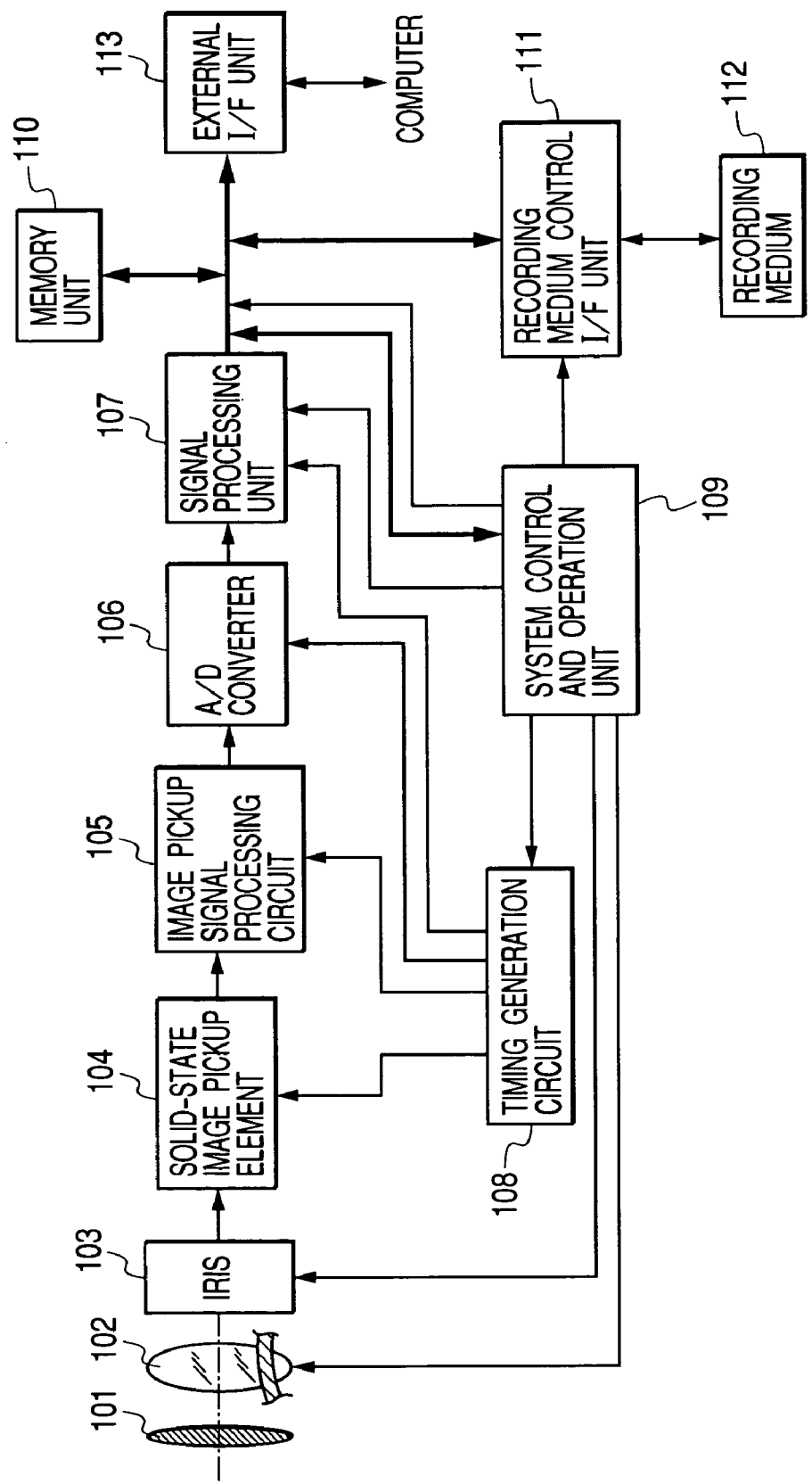
FIG. 4 is a block diagram showing a general configuration of an image pickup apparatus to which a solid-state image pickup apparatus according to the present invention has been applied.

An image pickup system using the solid-state image pickup apparatus according to one of the above-described two embodiments will now be described. An embodiment in the case where a solid-state image pickup element according to the present invention will now be described in detail with reference to FIG. 4. FIG. 4 is a block diagram showing the case where a solid-state image pickup element according to the present invention is applied to a digital camera.

With reference to FIG. 4, reference numeral 101 denotes a barrier serving as a lens protector and a main switch, 102 a lens for forming an optical image of an object on a solid-state image pickup element 104, 103 an iris for varying the quantity of light passed through the lens 102, 104 a solid-state image pickup element for picking up an image of the object formed by the lens 102 as an image signal, 106 an A/D converter for conducting A/D conversion on an image signal output from the solid-state image pickup element 104, and 107 a signal processing unit for conducting various corrections and compression on image data output from the A/D converter 106. Reference numeral 108 denotes a timing generation circuit for outputting various timing signals to the solid-state image pickup element 104, an image pickup signal processing circuit 105, the A/D converter 106 and the signal processing unit 107. Reference numeral 109 denotes a system control and operation unit for conducting various arithmetic operations and controlling the whole still video camera, 110 a memory unit for temporarily storing image data, and 111 an interface unit for recording/reading out image data onto/from a recording medium. Reference numeral 112 denotes a recording medium, such as a semiconductor memory, for recording/reading out image data thereon/therefrom that can be loaded and unloaded. Reference numeral 113 denotes an interface unit for conducting communication with an external computer or the like.

Operation of the digital camera having the above-described configuration at the time of image pickup will now be described.

If the barrier 101 is opened, a main power supply is turned on. Subsequently, a power supply for a control system is turned on. In addition, a power supply for circuits, such as the A/D converter, in an image pickup system is turned on.

Then the system control and operation unit 109 opens the iris 103 in order to control the exposure quantity. The signal output from the solid-state image pickup element 104 is converted by the A/D converter 106, and then input to the signal processing unit 107. On the basis of this data, the system control and operation unit 109 conducts arithmetic operations for exposure.

The system control and operation unit 109 judges the brightness on the basis of a result of the photometry, and controls the iris on the basis of the judgment.

Subsequently, high frequency components are extracted from the signal output from the solid-state image pickup element 104. The system control and operation unit 109 conducts an arithmetic operation to operate a distance from the object. Thereafter, the lens is driven and it is determined whether the lens is in focus. If the lens is judged to be out of focus, then the lens is driven again and the distance measurement is conducted.

After it has been ascertained that the lens is in focus, real exposure is started. If the exposure is finished, then the image signal output from the solid-state image pickup element 104 is subjected to A/D conversion in the A/D converter 106, passed through the signal processing unit 107, and written into the memory unit 110 by the system control and operation unit 109. Thereafter, data stored in the memory unit 110 is passed through the recording medium control I/F unit 111 and recorded on the recording medium 112, such as a semiconductor memory, which can be loaded and unloaded, under the control of the system control and operation unit 109. Or the data stored in the memory unit 110 may be passed through the external I/F unit 113, input directly to a computer, and subjected to image processing therein.

Many widely different embodiments of the present invention may be constructed without departing from the spirit and scope of the present invention. It should be understood that the present invention is not limited to the specific embodiments described in the specification, except as defined in the appended claims.

What is claimed is:

1. The solid-state image pickup apparatus including an array of a plurality of pixel units, each of the pixel units including a plurality of photodiodes, one amplification transistor for receiving and outputting signals from the plurality of photodiodes, and a plurality of transfer transistors transferring the signal from each of the photodiodes to said amplification transistor, comprising:

a readout circuit connected to an output line of the amplification transistor, for receiving output signals from the amplification transistor via the output line, wherein the readout circuit comprises difference means for providing a difference signal with respect to a plurality of combinations of any two of first, second and third signals, the first signal corresponding to a reset level of the amplification transistor, the second signal corresponding to a combination of the first signal and the signal of one of the plurality of photodiodes, and the third signal corresponding to a combination of the second signal and the signal of another of the plurality of photodiodes; and wherein the difference means operates on a difference between the first signal and the second signal, and a difference between the second signal and the third signal.

2. The solid-state image pickup apparatus including an array of a plurality of pixel units, each of the pixel units including a plurality of photodiodes, one amplification transistor for receiving and outputting signals from the plurality of photodiodes, and a plurality of transfer transistors transferring the signal from each of the photodiodes to said amplification transistor, comprising:

a readout circuit connected to an output line of the amplification transistor, for receiving output signals from the amplification transistor via the output line, wherein the readout circuit comprises difference means for providing a difference signal with respect to a plurality of combinations of any two of first, second and third signals, the first signal corresponding to a reset level of the amplification transistor, the second signal corresponding to a combination of the first signal and the signal of one of the plurality of photodiodes, and the third signal corresponding to a combination of the second signal and the signal of another of the plurality of photodiodes;

wherein the difference means operates on a difference between the first signal and the second signal, and a difference between the first signal and the third signal.

* * * * *